B. EDMOND & N. E. BARNES.
AUTOMATIC FILM MOVER.
APPLICATION FILED MAY 22, 1913.

1,124,879.

Patented Jan. 12, 1915.
2 SHEETS—SHEET 1.

WITNESSES:

INVENTORS
Berger Edmond
Ned E. Barnes
BY
Hardway & Cathey
ATTORNEYS.

B. EDMOND & N. E. BARNES.
AUTOMATIC FILM MOVER.
APPLICATION FILED MAY 22, 1913.
1,124,879.
Patented Jan. 12, 1915.
2 SHEETS—SHEET 2.
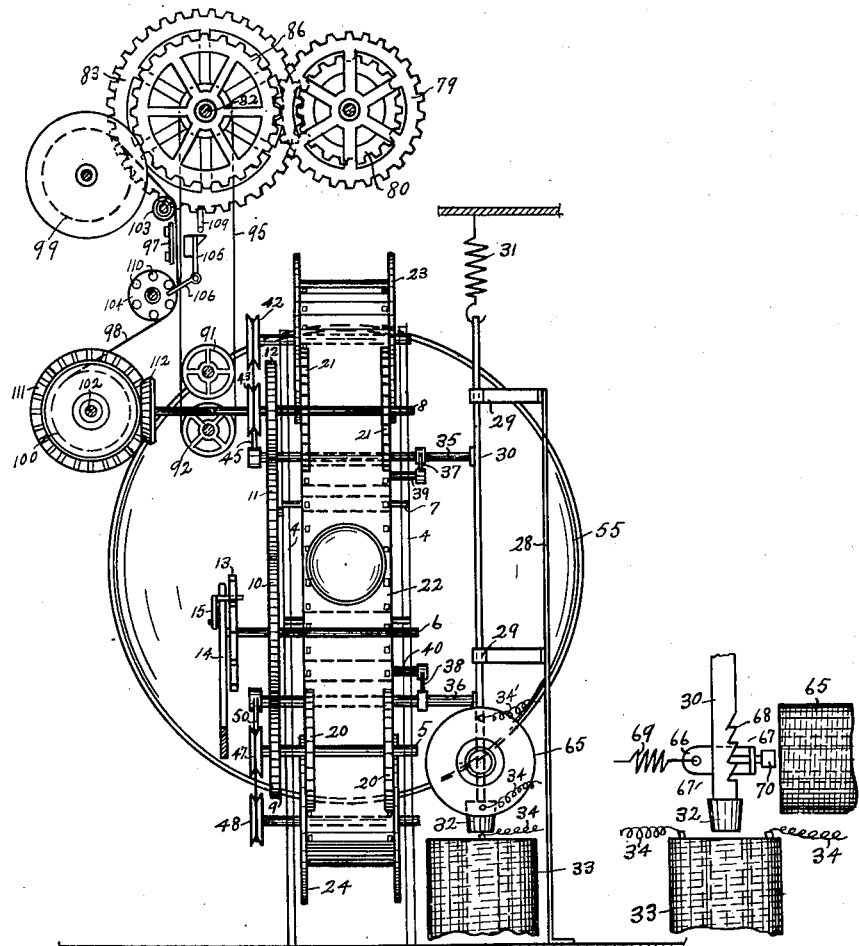
Fig. 3.
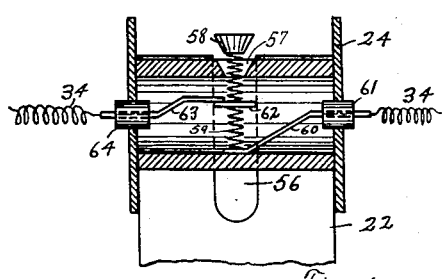
Fig. 4.
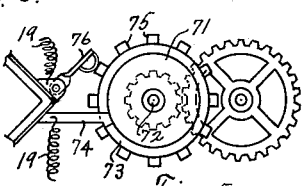
Fig. 5.
Fig. 6.
WITNESSES:
INVENTORS
Berget Edmond
Ned E. Barnes
BY
Hardway & Cathey
ATTORNEYS

UNITED STATES PATENT OFFICE.

BERGER EDMOND AND NED E. BARNES, OF HOUSTON, TEXAS.

AUTOMATIC FILM-MOVER.

1,124,879.  Specification of Letters Patent.  Patented Jan. 12, 1915.

Application filed May 22, 1913. Serial No. 769,152.

*To all whom it may concern:*

Be it known that we, BERGER EDMOND and NED E. BARNES, citizens of the United States, residing at Houston, in the county of Harris and State of Texas, have invented certain new and useful Improvements in Automatic Film-Movers, of which the following is a specification.

This invention relates to new and useful improvements in an automatic film mover.

The object of the invention is to provide a device of the character described, whereby a film carrying signs may be automatically moved and comprehends also a mechanism whereby said signs will be projected upon a screen carried by the device.

A further feature of the invention resides in the provision of a mechanism whereby the movement of the film may be automatically reversed.

With the above and other objects in view, the invention has particular relation to certain novel features of construction, operation and arrangement of parts, an example of which is given in this specification and illustrated in the accompanying drawings, wherein—

Figure 2:
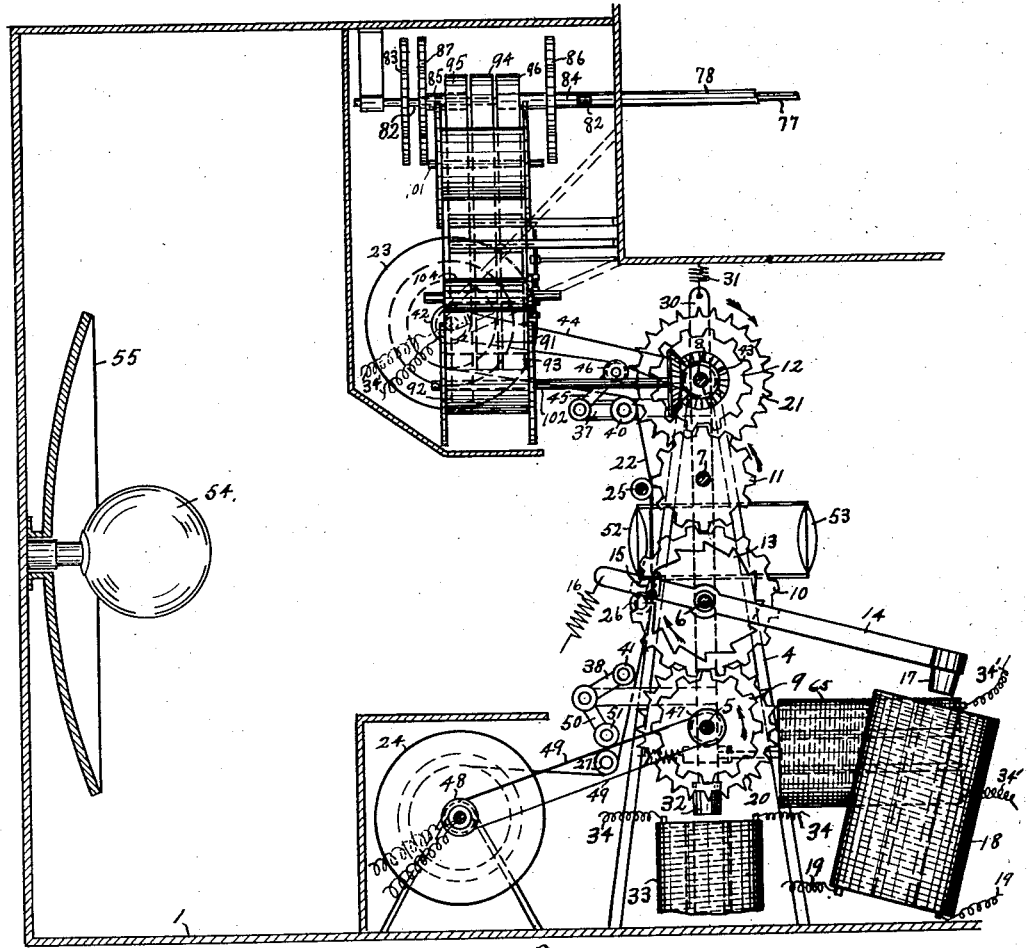
Figure 1:
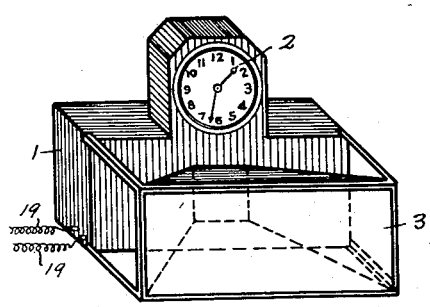

Figure 1 is a perspective view of the complete device. Fig. 2 is a side elevation thereof, showing the casing in section. Fig. 3 is a front elevation of the device, showing fragmentary sectional views of the casing. Fig. 4 shows a fragmentary sectional view of an automatic contact maker and breaker, used in connection with the film reversing mechanism. Fig. 5 shows a side elevation of an automatic contact maker used in connection with the device, and Fig. 6 shows a fragmentary side elevation of a portion of the automatic film reversing mechanism.

Referring now more particularly to the drawings, wherein like numerals of reference designate similar parts in each of the figures, the numeral 1 refers to a box-like casing which incloses the operative mechanism of the device and which carries a clock 2 of the usual construction. Fixed in front of the casing 1 is a screen 3 formed of translucent glass or other desirable translucent material upon which the signs to be displayed are to be projected. Upstanding from the bottom of the casing 1 are the supports 4, 4 which are provided to support the operative mechanism and rotatably mounted in suitable bearings in these supports are the respective shafts 5, 6, 7 and 8, rigidly mounted upon the corresponding ends of which are the respective spur gear wheels 9, 10, 11 and 12, which intermesh, as shown in Fig. 2 and rotate in the direction indicated by the arrows in said figure. The shaft 6 is extended and rigidly mounted upon the end thereof is a ratchet wheel 13 and said shaft projects a distance beyond said ratchet wheel through a bearing in the lever 14. This lever has a dog 15 pivoted thereto, disposed to engage with the teeth of the ratchet wheel 13. The lever 14 extends each way beyond its bearing and to one end thereof is attached a coil spring 16, said spring being secured at its other end to the frame work of the device. The opposite end of the lever 14 has an armature 17 alined with a solenoid 18. This solenoid is energized from suitable batteries (not shown) through the electrical conductors 19, 19. The ordinary push button (not shown) may be used to complete or break the circuit through the conductors 19, 19 or the contact may be made or broken by means of the automatic contact maker or breaker shown in Fig. 5 and to be specifically described hereinafter. When the solenoid 18 is energized, the armature 17 will be attracted thereto which will operate through the lever 14 and the dog 15 to impart a partial rotation to the ratchet wheel 13 and the shaft 6 which in turn will be transmitted to the gear wheels 9, 10, 11 and 12. When the circuit through the electrical conductors 19 is broken and the solenoid 18 deënergized the pull of the spring 16 against the lever 14 will operate to withdraw the armature 17 from its solenoid and the dog 15 will be withdrawn and will engage behind the next succeeding tooth of the ratchet wheel 15.

Rigidly mounted upon each of the shafts 5 and 8 are two sprocket wheels 20, 20 and 21, 21, the teeth of which are alternatively engaged with the film 22 and operate to move the same in one direction or the other according to which of said sprocket wheels engage with said film. Two spools 23 and 24 are rotatably mounted in the frame 1, one above the other, and the respective ends of the film 22 are wound around said spools. As the film travels in one direction it unwinds from one of said spools and winds around the other and vice versa, said film moving over the roller pulleys 25, 26 and 27.

An upstanding support 28 is fixed to the bottom of the casing 1 and is provided with two sliding bearings 29, 29, one alined above the other, and the rod 30 slides in these bearings. This rod is suspended from the top of the casing 1 by means of a coil spring 31 and its lower end carries an armature 32 alined with the solenoid 33, which is energized through the electrical conductors 34, 34 in the manner hereinafter to be set forth. The rod 30 carries two laterally extending shafts 35 and 36 which are fixed thereto at one end and fixed to these respective shafts and extending therefrom are the respective arms 37 and 38 whose free ends support the respective shafts 39 and 40 which carry the respective roller pulleys 40 and 41 over which the film 22 moves. When the solenoid 33 is deënergized, the rod 30 is pulled upwardly by the tension of the spring 31 which operates through the shaft 35 and the arm 37 to carry the roller 40 upwardly and to bring the film 22 into engagement with the teeth of the sprocket wheels 21 and as said sprocket wheels are rotated, said film is moved toward the spool 23 upon which the same is wound. The shaft of the spool 23 carries a pulley 42 and the shaft 8 carries a pulley 43, said pulleys being alined, and a cable 44 normally runs loosely thereon. The end of the shaft 35 carries an upwardly extending arm 45, whose free end carries a pulley 46. When the rod 30 is elevated, the pulley 46 is carried into contact with the cable 44 and takes up the slack thereof and causes said cable to transmit rotation to the spool 23 which winds up the film 22 as it is driven forward by the sprocket wheels 21. When the solenoid 33 is energized, the tension of the spring 31 will be overcome and the rod 30 will be forced downwardly until the armature 32 contacts with said solenoid. This downward movement of the rod 30 will release the film 22 from the sprocket wheels 21 and the roller pulley 41 will carry said film into engagement with the sprocket wheels 20 and will reverse the direction of movement of the said film.

The shaft 5 carries a rigidly mounted pulley 47 alined with a rigidly mounted pulley 48 carried by the end of the shaft of the spool 24 and a cable 49 normally runs loosely on said pulleys. The free end of the shaft 36 has a downwardly extending rigidly mounted arm 50 whose free end carries a pulley 51 and when the rod 30 moves downwardly, said pulley 51 engages against the cable 49 and takes up the slack thereof and transmits rotation from said pulley 47 to the spool 24 which takes up the film 22 as it is driven forward by the sprocket wheels 20. The film 22 passes between magnifying lenses 52 and 53 and fixed to the casing 1 and alined with said lenses is a suitable lamp 54 having the reflector 55. The signs to be displayed are printed upon the film and said signs are enlarged by the lenses and projected by the lamp 54 upon the screen 3.

This device is adapted to be used in street cars or railway coaches for the purpose of announcing streets or stations and when so used the names of the streets or stations will be printed upon the film and projected upon the screen 3 in view of the occupants of the coach. When used for this purpose, the ordinary push button will be used for completing the circuit through the wires 19, 19 and energizing the solenoid 18. This button should be located at some convenient place so that as a street or station is reached, the conductor can push the button which will result, as hereinbefore described, in the movement of the film 22 to the desired point. When the film 22 is completely unwound from either of the spools 23 or 24, the direction of its movement will be automatically reversed by means of a mechanism which will now be described.

The spools 23 and 24 are composed of some non-conducting material, such as gutta-percha and the center portion of each end of the film 22 is cut away, forming a slot 56. The said spools are hollow and in one side of which is a flared orifice 57 in which normally seats the plug 58 which rests upon a strong coil spring 59. The lower end of said spring being attached to the inner wall of the spool opposite the orifice 57 and contacting with a metallic tongue 60 which extends through an insulating bearing 61 carried by one end of the spool. The spring 59 carries a contact point 62 arranged to contact with a metallic tongue 63 extending through the insulating bearing 64 carried by the other end of said spool. The electrical conductors 34 of the spool 24 have connection with the respective tongues 60 and 63. When the film 22 is wound around the spool, the plug 58 is forced to seat firmly in the orifice 57 and the spring 59 is compressed carrying the contact point 62 out of contact with the tongue 63 and breaking the circuit between the wires 34, but when the film is entirely unwound from said spool the plug 58 is released to the pressure of the spring 59 and the contact point 62 is carried up into contact with the tongue 63 and a circuit is completed through one of the wires 34, the tongue 60, the coil spring 59, the contact point 62 and the tongue 63 with the other of said wires. Both of the spools 23 and 24 are constructed as just described. When the film is wound around the spool 23 and completely unwound from the spool 24, the plug 58 of the spool 24 will be released and assumes the position shown in Fig. 4 and a complete circuit will be formed through the wire 34 which will energize the solenoid 33, causing a downward movement of the rod 30 and releasing the film 22 from the sprocket wheels 21 and carrying it into engagement with the sprocket wheels 20 and at the same time releasing the cable 44 from the pressure of the pulley 46 and subjecting the cable 49 to the pressure of the pulley 51. The movement of the film 22 will thus be reversed and will be gradually wound around the spool 24 and unwound from the spool 23. As the film winds around the spool 24 it will depress the plug 58 and seat it in position, compressing the spring 59 and carrying the contact point 62 out of contact with the tongue 63 and breaking the circuit between the wires 34.

The numeral 65 designates a solenoid which is energized through the electrical conductors 34', 34', connected with the tongues 60 and 63 of the spool 23. A latch 66 is provided which is slidably mounted and held in position by means of the straps 67, 67. The lower end of the rod 30 is provided with rack teeth 68 and to one end of the latch 67 is attached one end of the coil spring 69 whose other end is attached to a suitable stationary support carried by the frame work of the device. This spring normally holds the latch in engagement with one of the teeth 68 and when in this position the rod 30 is locked against upward movement. The other end of the latch 66 has a small armature 70 arranged to be influenced by the solenoid 65. When the contact is broken between the conductors 34, 34 of the spool 24, as hereinbefore explained, the solenoid 33 is deënergized but the rod 30 is held against upward movement by the latch 66 which is in engagement with one of the teeth 68 of said rod and said rod will be held in its lowered position and the film 22 held in engagement with the sprocket teeth of the wheels 20. As the lever 14 is manipulated, under the influence of the solenoid 18, as hereinbefore explained, the film 22 will be intermittently moved and wound upon the spool 24 and unwound from the spool 23 until the film is entirely unwound from said spool 23. When entirely unwound from said spool the plug 58 thereof will be released and a contact made and a circuit completed through the conductors 34', 34', by means of a mechanism similar to that just described. The contacting wires 34', 34' have connection with the solenoid 65 so that when the film is unwound from the spool 23 the solenoid 65 is energized and under its influence the latch 66 is disengaged from the rack teeth 68 of the rod 30 and said rod is released to the upward pull of the spring 31 which operates through the mechanism hereinbefore described to release the film from the sprocket wheels 20 and carry the same into engagement with the sprocket wheels 21 which will reverse the movement of said film. As the film winds around the spool 23 the plug 58 of said spool is depressed and the connection between the conductors 34', 34' is broken and the solenoid 65 is deënergized so that when the rod 30 is again pulled downward the latch 66 will be in position to engage with the teeth 68 thereof.

This device is designed to be used for displaying signs for advertising and other purposes and its use will not be confined to the purpose of announcing streets or stations when used on cars, as hereinbefore explained. When so used, instead of the ordinary push button for forming a circuit through the wires 19, 19, an automatic contact maker and breaker, such as illustrated in Fig. 5 will be used. This mechanism will now be described.

A wheel 71 is rigidly mounted upon a suitable shaft 72 and has a metallic ring 73 secured upon one side thereof with which a metallic brush 74 is in constant contact. This brush is connected to one of the electrical conductors 19. The periphery of the wheel 71 carries a plurality of contact points 75, in contact with the ring 73 and projecting from the periphery of said wheel 71. As the wheel 71 rotates, the contact points 75 are brought successively into contact with the metallic tongue 76 which has connection with the other of the electrical conductors 19. The wheel 71 is geared to the ordinary clock works, or some other suitable motor and rotation is thereby imparted to it so that at predetermined intervals a circuit will be completed between the wires 19, 19 and the solenoid 18 energized and at other times the circuit will be broken and said solenoid deënergized with a corresponding influence upon the lever 14 and the gear mechanism hereinbefore described with the result that the film 22 is automatically moved.

What we claim is:—

1. In a device of the character described, a suitable casing, a screen carried thereby, a reflecting lamp arranged within the casing and alined with the screen, a movable film alternately movable in opposite directions and arranged to pass between said lamp and screen and provided to carry objects which will be projected by said lamp upon said screen, a mechanism for moving said film, a pair of spools which alternatively receive the film, means for imparting positive rotation to the spools alternatively but in opposite directions and means for operatively connecting said last mentioned means alternatively with said spools and film-moving mechanism.

2. In a device of the character described, a suitable casing, a screen, an illuminator arranged within the casing and alined with the screen, a movable film arranged between said illuminator and screen and having representation characters thereon which will be projected by said illuminator upon said screen, a mechanism for moving said film, a prime mover through the influence of which said mechanism is operated, electrical connections controlling said prime mover and means for shifting the position of the film relative to its moving mechanism whereby said film will be moved, by said mechanism, in each direction, alternatively.

3. In a device of the character described, a suitable casing, a screen, an illuminator arranged within the casing and alined with the screen, a movable film arranged to pass in alinement with said illuminator and screen and having representation characters thereon which will be projected by said illuminator upon said screen, a mechanism for imparting intermittent movement to said film, a prime mover through the influence of which said mechanism is operated, electrical connections controlling said prime mover and means for shifting the position of the film relative to this moving mechanism whereby said film will be moved by said mechanism in each direction, alternatively.

4. A device of the character described including a suitable casing, a screen carried thereby, a lamp arranged within the casing and alined with the screen, a film arranged to pass between said lamp and screen and provided to carry objects which will be projected by said lamp upon said screen, a mechanism for moving said film, a pair of rotatable spools, around which the film is adapted to wind, one of which receives the film as the same unwinds from the other spool, means for rotating said spool alternatively, but in opposite directions, means for operatively connecting said last mentioned means alternatively with said spools and film-moving-mechanism, and means for shifting the position of the film relative to the film moving mechanim, whereby the film is alternatively driven in opposite directions by its moving mechanism.

5. In a device of the character described, a suitable casing, a screen carried thereby, a reflecting lamp arranged within the casing and alined with the screen, a film alternatively movable in opposite directions and arranged to pass between said lamp and screen and provided to carry objects which will be projected by said lamp upon said screen, a mechanism for moving said film, an arm operatively connected with said mechanism, an armature carried by one end of said arm, a solenoid in alinement with said armature, a pull spring in connection with the other end of said arm whose tension normally holds said armature out of contact with said solenoid, a pair of spools which alternatively receive the film, means for shifting the position of the film relative to its moving mechanism whereby said film will be moved by said mechanism in each direction, alternatively.

6. In a device of the character described, a suitable casing, a screen carried thereby, a reflecting lamp arranged within the casing and alined with the screen, a film alternatively movable in opposite directions and arranged to pass between said lamp and screen and provided to carry objects which will be projected by said lamp upon said screen, a mechanism for moving said film, an arm operatively connected with said mechanism, an armature carried by one end of said arm, a solenoid in alinement with said armature, a pull spring in connection with the other end of said arm whose tension normally holds said armature out of contact with said solenoid, a pair of spools which alternatively receive the film, means for shifting the position of the film relative to its moving mechanism whereby said film will be moved by said mechanism in each direction, alternatively, said last mentioned means including a vertically movable rod, an armature carried by the lower end thereof, a coil spring, by means of which said rod is suspended, a solenoid alined with said armature, two laterally extending shafts fixed to said rod, an arm carried by the free end of each shaft and a roller pulley carried by each arm over which pulleys said film moves, said pulleys being provided to shift the position of the film relative to its moving mechanism as said rod is moved up and down under the influence of said spring and solenoid.

In testimony whereof we have signed our names to this specification in the presence of two subscribing witnesses.

BERGER EDMOND.
NED E. BARNES.

Witnesses:
J. W. YEAGLEY,
MAY MONTGOMERY.